Oct. 17, 1950     H. T. LAMBERT     2,526,143
CAM ACTUATED DISK BRAKE
Filed June 20, 1947     2 Sheets-Sheet 2
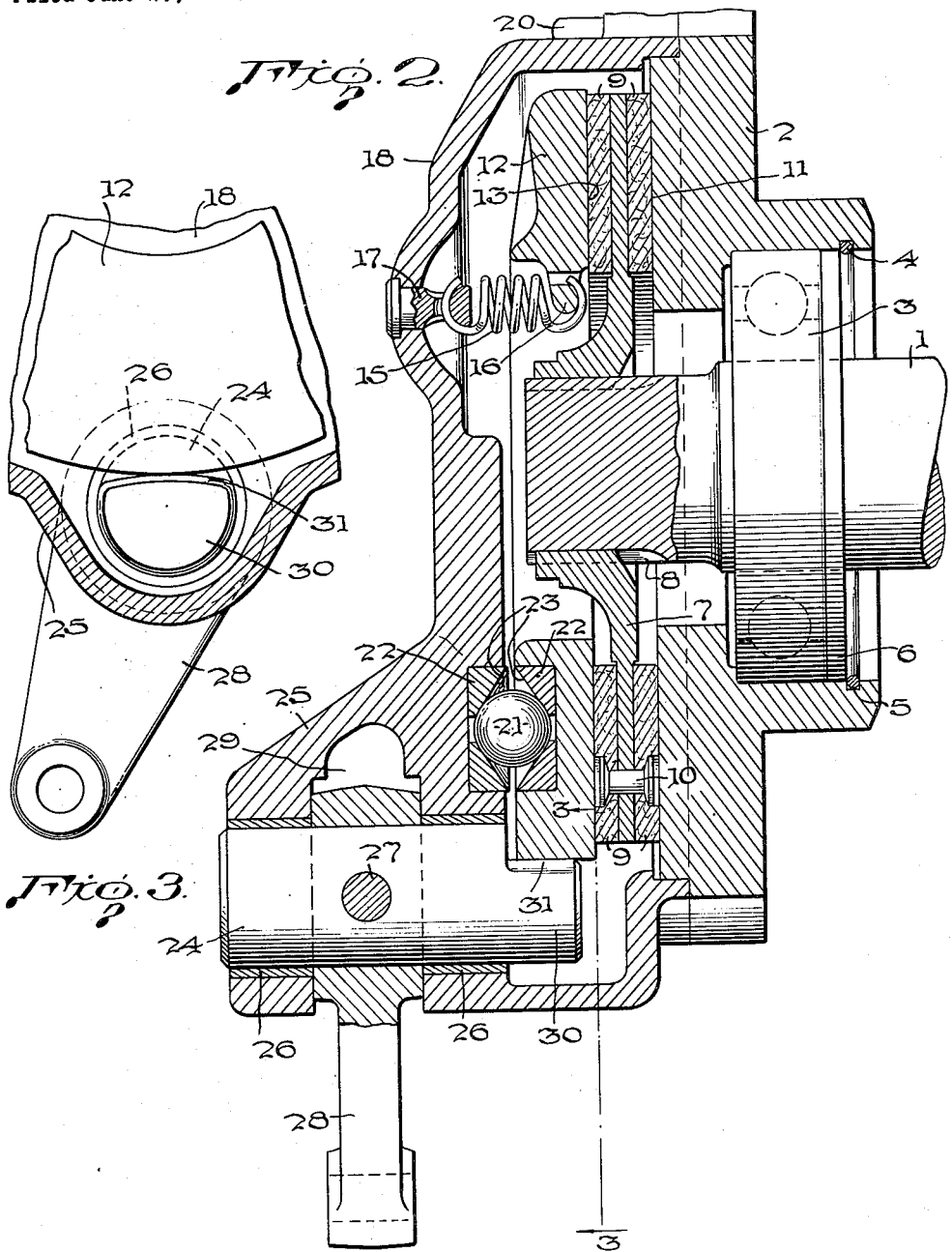
INVENTOR.
H. T. Lambert
BY
Robb & Robb
ATTORNEYS Patented Oct. 17, 1950

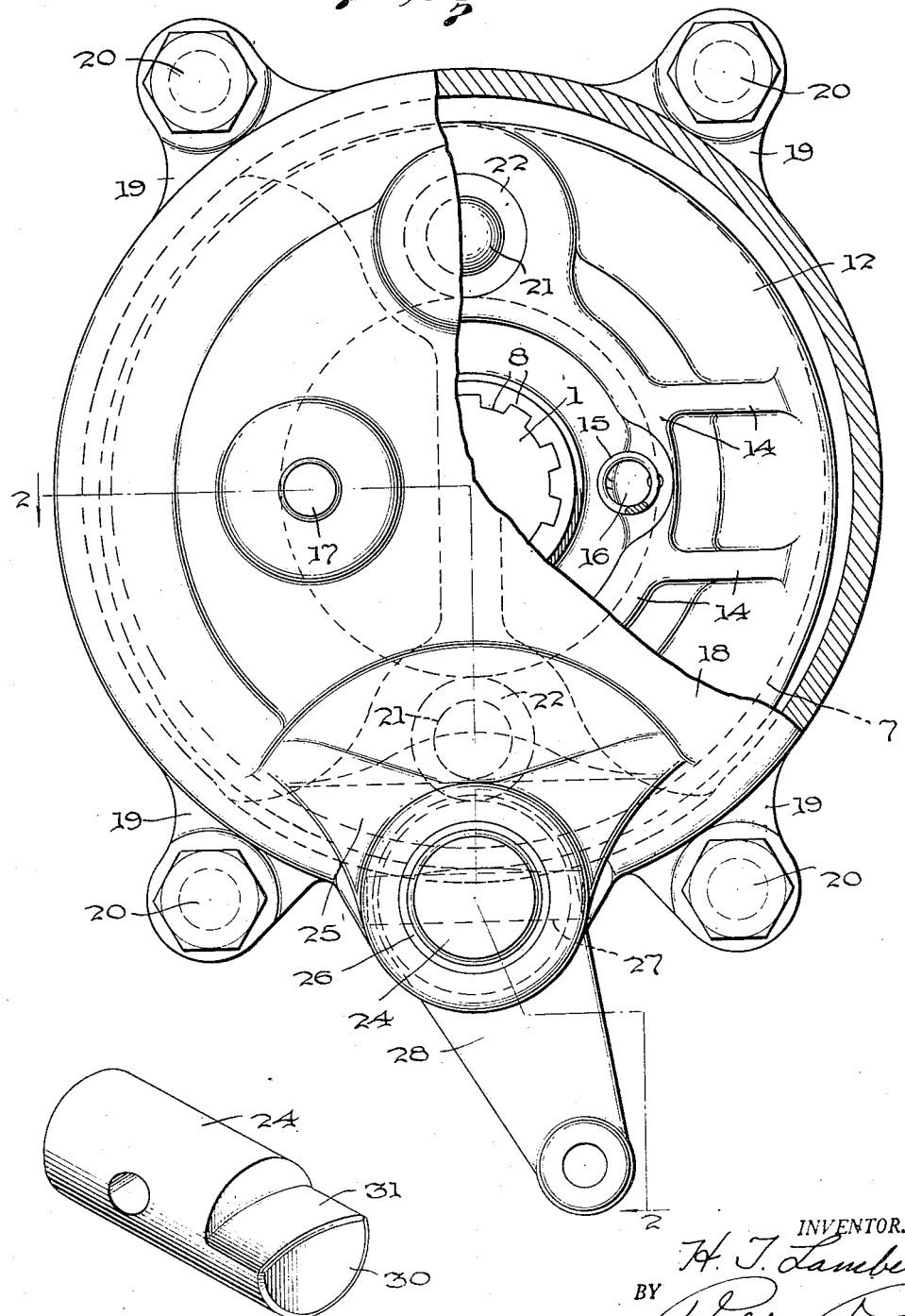

2,526,143

UNITED STATES PATENT OFFICE 2,526,143

CAM ACTUATED DISK BRAKE

Homer T. Lambert, St. Joseph, Mich., assignor to Lambert Brake Corporation, St. Joseph, Mich., a corporation of Michigan Application June 20, 1947, Serial No. 755,834

19 Claims. (Cl. 188—72)

The present invention relates to brake mechanisms, and more especially to brakes of the disc type and which preferably are actuated on the self-energizing or servo principle.

The primary object of this invention is to provide a simple and relatively inexpensive brake mechanism which is of exceptionally sturdy construction, compact in form, employs a minimum number of component parts, is quick and powerful in its operation, and which may be readily mounted on the end of a shaft or other rotating part to be braked, such as counter shafts and the like which are in extensive use on farm tractors and on other automotive power equipment and transmissions.

The invention and its operation are characterized by the provision of a braking disc or ring, hereinafter referred to as a disc, which is to be mounted on the end of a rotatable shaft so as to be rotated with said shaft, but which is also axially movable on said shaft to permit movement of the disc towards and away from a stationary braking surface opposed to the disc, and which stationary braking surface may be formed as a flat face on the end of the shaft support or housing, adjacent to the end of the shaft on which the brake disc is mounted. At the opposite side of the disc aforesaid, there is disposed a second disc or ring, also hereinafter referred to as a disc, which is yieldingly suspended in opposed relation to the first disc, so as to be movable both axially relative to the shaft, as well as radially or laterally relative to the shaft and first disc. This second disc may be suspended by two or more springs connected to the same and to a housing enclosing the brake assembly and preferably removably attachable to the shaft support or housing, said springs serving to normally sustain the second disc in a concentric position relative to the shaft and the first disc, or alternatively, in a slightly eccentric position relative thereto. Rockably mounted in the brake housing or otherwise supported adjacent to the second disc is an actuating member preferably having the form of a short shaft which is connected to a brake control arm, said short shaft having an eccentric cam surface formed on one end thereof and engaging the edge of the second disc aforesaid. Between the brake housing and the second disc is disposed two or more thrust members having the form of balls or equivalent rolling members, and which are respectively seated between opposed cam surfaces carried by the brake housing and by the second disc, respectively, said cam surfaces preferably having the form of inserts which are provided with oppositely inclined cam faces with which the thrust members or balls are engaged. Thus, when the brake actuating shaft is rocked in one direction pursuant to brake-applying operation of the control arm connected therewith, the cam on the end of the actuating shaft will be shifted so as to radially or laterally displace the second brake disc, which displacement induces an axial thrust upon the second disc towards the rotating first disc, as produced by the relative displacement of the thrust members or balls and their opposed cam surfaces or inserts. As the initial axial displacement of the second disc continues, it ultimately engages the rotating first disc and induces the latter to move towards the stationary braking surface at the opposite side of the first disc, until there is sufficient friction created between the engaged braking surfaces of the brake members, tending to produce a limited rotation of the second disc relative to the brake housing, and creating a still more powerful axial thrust against the second disc in the nature of a self-energizing or servo braking action. Upon rocking the brake actuating shaft in the opposite direction to a brake-releasing position, the springs will automatically draw the second disc away from the first, thus disengaging all the braking surfaces and allowing the first disc to run free with the shaft on which it is mounted.

Generally speaking, it is a prime object of the invention to provide a plurality of brake members of substantially disc form, at least one of which is movable towards and away from the other by suitable thrust means, and is also free to move radially or laterally, as well as rotatively, relative to the other, to activate the thrust means and produce a cooperative braking action between the brake members, in combination with cam means engageable with the latter brake member for producing the lateral or radial movement aforesaid, and consequently to initiate the braking action.

Other and further objects and advantages of the invention will be hereinafter described and the novel features thereof defined in the appended claims.

In the drawings:

Figure 1 is a view partly in end elevation and partly in section, illustrating a brake mechanism constructed in accordance with the present invention;

Figure 2 is a sectional view taken on the line 2—2 of Figure 1, and showing the brake assembly applied to the end of a shaft, with the assembly attached to the shaft support or housing;

Figure 3 is a fragmentary sectional view taken on the line 3—3 of Figure 2, and more particularly showing the form and arrangement of the brake actuating cam; and Figure 4 is a detail view in perspective of the brake actuating shaft and cam per se.

Like reference characters designate corresponding parts in the several figures of the drawings, wherein 1 generally denotes a shaft such as a counter-shaft or other rotatable part which is to be braked, said shaft being rotatably mounted in a suitable support or housing 2 which may be a part of the frame of the equipment or machine of which the shaft 1 is a part. The shaft 1 is preferably mounted in a bearing 3 which is seated in the shaft support or housing 2, and which also may be equipped with suitable grease retainers (not shown) and a retainer snap ring 4 which is engaged in an annular groove 5 formed in the wall of the bearing cavity 6 of the shaft support or housing 2.

Mounted on the end of the shaft 1 is a brake member 7 having the form of a disc or ring, said brake member 7 being suitably connected to the shaft 1 for rotation therewith, as well as being axially movable on the end of the shaft, as permitted by splines generally indicated at 8, or some other suitable form of connection. The brake member 7 preferably has applied to the opposite faces thereof suitable friction linings 9 which are preferably attached thereto by countersunk rivets 10 arranged at spaced intervals about the axis of the brake member 7, or by other suitable fastening means. The brake member 7 is disposed in opposed relation to a braking surface 11 which may be provided by forming a flat face on the end of the shaft support or housing 2.

At the opposite side of the brake member 7, and disposed in opposed relation thereto, is a second brake member 12 having the form of a disc or ring, and having a flat braking surface 13 on one face thereof, and being provided on the opposite face thereof with suitable reinforcing and heat-dissipating ribs or flanges 14. This second brake member 12 is yieldably suspended by two or more springs 15, two such springs being shown in the drawings in diametrically opposed relation to each other, said springs each being suitably connected at one of their ends to an ear 16 formed on the brake member 12, and connected at their opposite end to a plug 17 mounted in a brake housing generally indicated at 18, said housing enclosing the working parts of the brake assembly and being preferably provided with a plurality of outwardly extended ears or lugs 19 having apertures therethrough for the reception of fastening bolts 20 which may be employed to removably attach the housing 18 to the shaft support or housing 2.

In the arrangement as illustrated by way of example in the accompanying drawings, the brake member 12 is yieldingly supported by the springs 15 in a position initially slightly eccentric in relation to the shaft 1 and the brake member 7, but it should be understood that this initial eccentric relation is not essential, since the brake mechanism will work equally well with the brake member 12 initially disposed in a concentric position.

By reason of the suspension of the brake member 12 through means of the springs 15, as previously described, this brake member is free to move towards and away from the brake member 7, in an axial direction, and is also free to move laterally or radially, as well as rotatively to a limited extent, relative to the shaft 1 and brake member 7. Such movements of the brake member 12 are relied upon to initiate and produce the braking action as will now be more fully described.

Interposed between the brake member 12 and the brake housing 18 is a plurality of thrust members preferably having the form of steel balls 21, or other equivalent rolling members. At least two such balls are provided, but the number thereof may be increased if desired. In the arrangement as illustrated in the drawings, the balls 21 are arranged in diametrical opposition to each other, and equidistantly spaced from the springs 15. Each ball 21 is seated between a pair of hardened inserts 22, 22 arranged in opposed relation to each other and respectively mounted in the brake housing 18 and the brake member 12, said inserts having oppositely inclined cam faces 23 with which the interposed balls 21 are engaged.

Thus, by displacing the brake member 12 either in a lateral or radial direction or in a rotative direction, the balls 21 are permitted to roll between the cam faces 23 of the inserts 22, causing a powerful axial thrust against the brake member 12.

In order to initiate such axial thrust as above described, and to produce braking engagement of the brake members, I have provided an actuating member 24 which preferably has the form of a short shaft which is rockably mounted in the brake housing 18 near one edge thereof, said housing being preferably enlarged as at 25 to receive the actuating shaft 24, and being preferably equipped with bushings 26, 26 in which the shaft 24 is journaled. Attached to the shaft 24 by means of a pin 27, or in any other suitable manner, is a brake control arm 28 by means of which the shaft 24 may be rocked in either direction, said control arm 28 being located at an intermediate point on the shaft 24 and extending through a slot 29 formed in the enlarged portion 25 of the brake housing 18.

The inner end of the brake actuating shaft 24 preferably treminates in the form of a cam 30, said cam having an eccentric cam surface 31 engaging the outer marginal edge of the brake member 12 as clearly shown in Figures 2 and 3 of the accompanying drawings. Accordingly, when the brake actuating shaft 24 is rocked in one direction to a brake-applying position, the cam surface 31 functions to displace the brake member 12 in a lateral or radial direction, against the yielding pull of the springs 15, and such displacement in turn causes the balls 21 to roll on the cam surfaces 23 of the inserts 22 to produce a thrust against the brake member 12 in the direction of the brake member 7, until the brake member 12 engages the friction lining 9 at the corresponding side of the brake member 7, and moves the brake member 7 axially inwardly on the shaft 1 until the friction lining 9 on the opposite side of the brake member 7 engages the braking surface 11 on the shaft support or housing 2. When the braking surfaces are in engagement with each other, as initiated by the rocking movement of the actuating shaft 24 in the manner above described, an initial braking force is set up until there is sufficient friction created between the engaged braking surfaces of the brake members, tending to produce a limited rotation of the brake member 12, pursuant to rotation of the brake member 7, thereby creating a still more powerful axial thrust against the brake member 12 pursuant to the rolling action of the balls 21 between the cam faces 23 of the inserts 22, such further thrust being in the nature of a self-energizing or servo braking action.

Upon rocking the brake actuating shaft 24 in the opposite direction, to a brake-releasing position, the springs 15 will draw the brake member 12 away from the brake member 7, thus disengaging the braking surfaces and allowing the brake member 7 to run free with the shaft 1 on which it is mounted.

The construction and operation of the brake mechanism will be apparent from the foregoing, and it will be further understood that the brake is exceptionally simple and sturdy in construction, compact in form, and employs a minimum number of component parts which largely may be made of grey iron or steel. All parts of the brake are readily accessible, and the working parts are fully enclosed and protected against dirt, dust, water, and weather elements, minimizing wear and preserving the effectiveness of the braking action which is normally very quick, smooth and powerful.

While the specific details have been herein shown and described, the invention is not confined thereto as changes and alterations may be made without departing from the spirit thereof as defined by the appended claims.

I claim:

1. In a brake mechanism of the class described, for use with a rotatable part to be braked, a disc member having provision for mounting the same on the rotatable part aforesaid for rotation therewith and for axial movement thereon, a member having a stationary braking surface disposed in opposed relation to the disc member at one side of the latter and engageable by the disc member on axial movement of the disc member towards the same, a second disc member disposed at the opposite side of said first disc member, means for yieldably suspending said second disc member and permitting axial movement of the second disc member towards and away from the first disc member, as well as radial and limited rotative movements of the second disc member relative to the first disc member, thrust means operable upon the second disc member to move the same towards the first disc member responsive to radial movement of the second disc member, and means for imparting radial movement to the second disc member.

2. In a brake mechanism of the class described, for use with a rotatable part to be braked, a disc member having provision for mounting the same on the rotatable part aforesaid for rotation therewith and for axial movement thereon, a member having a stationary braking surface disposed in opposed relation to the disc member at one side of the latter and engageable by the disc member on axial movement of the disc member towards the same, a second disc member disposed at the opposite side of said first disc member, means for yieldably sunspending said second disc member and permitting axial movement of the second disc member towards and away from the first disc member, as well as radial and limited rotative movements of the second disc member relative to the first disc member, thrust means operable upon the second disc member to move the same towards the first disc member responsive to radial movement of the second disc member, and also responsive to limited rotative movement of the second disc member, and means for imparting radial movement to the second disc member.

3. In a brake mechanism of the class described, for use with a rotatable part to be braked, a disc member having provision for mounting the same on the rotatable part aforesaid for rotation therewith and for axial movement thereon, said disc member having friction linings on opposite faces thereof, a member having a stationary braking surface disposed in opposed relation to the disc member at one side of the latter and engageable by the disc member on axial movement of the disc member towards the same, a second disc member disposed at the opposite side of said first disc member, means for yieldably suspending said second disc member and permitting axial movement of the second disc member towards and away from the first disc member, as well as radial and limited rotative movements of the second disc member relative to the first disc member, thrust means operable upon the second disc member to move the same towards the first disc member responsive to radial movement of the second disc member, and means for imparting radial movement to the second disc member.

4. In a brake mechanism of the class described, for use with a rotatable part to be braked, a disc member having provision for mounting the same on the rotatable part aforesaid for rotation therewith and for axial movement thereon, a member having a stationary braking surface disposed in opposed relation to the disc member at one side of the latter and engageable by the disc member on axial movement of the disc member towards the same, a second disc member disposed at the opposite side of said first disc member, spring means for yieldably suspending said second disc member and permitting axial movement of the second disc member towards and away from the first disc member, as well as radial and limited rotative movements of the second disc member relative to the first disc member, thrust means operable upon the second disc member to move the same towards the first disc member responsive to radial movement of the second disc member, and means for imparting radial movement to the second disc member.

5. In a brake mechanism of the class described, for use with a rotatable part to be braked, a disc member having provision for mounting the same on the rotatable part aforesaid for rotation therewith and for axial movement thereon, a member having a stationary braking surface disposed in opposed relation to the disc member at one side of the latter and engageable by the disc member on axial movement of the disc member towards the same, a second disc member disposed at the opposite side of said first disc member, means for yieldably suspending said second disc member and permitting axial movement of the second disc member towards and away from the first disc member, as well as radial and limited rotative movements of the second disc member relative to the first disc member, thrust means operable upon the second disc member to move the same towards the first disc member responsive to radial movement of the second disc member, and cam means for imparting radial movement to the second disc member.

6. In a brake mechanism of the class described, for use with a rotatable part to be braked, a disc member having provision for mounting the same on the rotatable part aforesaid for rotation therewith and for axial movement thereon, a member having a stationary braking surface disposed in opposed relation to the disc member at one side of the latter and engageable by the disc member on axial movement of the disc member towards the same, a second disc member disposed at the opposite side of said first disc member, means for yieldably suspending said second disc member and permitting axial movement of the second disc member towards and away from the first disc member, as well as radial and limited rotative movements of the second disc member relative to the first disc member, thrust means operable upon the second disc member to move the same towards the first disc member responsive to radial movement of the second disc member, and means for imparting radial movement to the second disc member, said last-mentioned means comprising a brake actuating rock shaft having an eccentric cam surface on one end thereof, with the cam surface disposed in engagement with the marginal edge of said second disc member.

7. A brake mechanism as defined in claim 1, wherein the disc members are enclosed in a brake housing.

8. A brake mechanism as defined in claim 1, wherein the disc members are enclosed in a brake housing having means for removably attaching the same to the part having the stationary braking surface.

9. A brake mechanism as defined in claim 1, wherein the disc members are enclosed in a brake housing, and the yieldable suspension means for the second disc member comprises a plurality of coil springs, each connected at one end to the second disc member and at the other end to the brake housing.

10. A brake mechanism as defined in claim 1, wherein the disc members are enclosed in a brake housing, and the yieldable suspension means for the second disc member comprises a plurality of coil springs, each connected at one end to the second disc member and at the other end to the brake housing, said springs being normally under tension and tending to urge the second disc member away from the first disc member.

11. A brake mechanism as defined in claim 1, wherein the disc members are enclosed in a brake housing, and the means for imparting radial movement to the second brake member is carried by the brake housing.

12. A brake mechanism as defined in claim 1, wherein the disc members are enclosed in a brake housing, and the means for imparting radial movement to the second brake member is carried by the brake housing and comprises a brake actuating shaft rockably mounted in the brake housing and having an eccentric cam surface on one end of the shaft engaged with the outer marginal edge of the second disc member.

13. A brake mechanism as defined in claim 1, wherein the disc members are enclosed in a brake housing, and the thrust means is interposed between the brake housing and the second disc member.

14. A brake mechanism as defined in claim 1, wherein the disc members are enclosed in a brake housing, and the thrust means is interposed between the brake housing and the second disc member and comprises a plurality of rolling members seated between opposed and oppositely inclined cam surfaces carried by the brake housing and the second disc member, respectively.

15. A brake mechanism as defined in claim 1, wherein the disc members are enclosed in a brake housing, and the thrust means is interposed between the brake housing and the second disc member and comprises a plurality of rolling members seated between opposed inserts having oppositely inclined cam surfaces, said opposed inserts being mounted on the brake housing and the second disc member, respectively.

16. A brake mechanism of the class described, comprising a plurality of brake members disposed in opposed relation to each other and each having a braking surface cooperative with the other, one of said brake members being adapted to be mounted on a rotatable part to be braked, and another of said brake members being yieldably suspended for movement towards and away from the first, and also for radial and limited rotative movements relative to the first brake member, thrust means operable upon the yieldably suspended brake member to move the same towards the other brake member to engage the braking surfaces responsive to radial movement of the yieldably suspended brake member, and means for imparting radial movement to the last-mentioned brake member.

17. A brake mechanism of the class described, comprising a plurality of brake members disposed in opposed relation to each other and each having a braking surface cooperative with the other, one of said brake members being adapted to be mounted on a rotatable part to be braked, and another of said brake members being yieldably suspended for movement towards and away from the first, and also for radial and limited rotative movements relative to the first brake member, thrust means operable upon the yieldably suspended brake member to move the same towards the other brake member to engage the braking surfaces responsive to radial movement of the yieldably suspended brake member, and also responsive to limited rotative movement thereof, and means for imparting radial movement to the last-mentioned brake member.

18. A brake mechanism of the class described, comprising a plurality of brake members disposed in opposed relation to each other and each having a braking surface cooperative with the other, one of said brake members being adapted to be mounted on a rotatable part to be braked, and another of said brake members being yieldably suspended for movement towards and away from the first, and also for radial and limited rotative movements relative to the first brake member, thrust means operable upon the yieldably suspended brake member to move the same towards the other brake member to engage the braking surfaces responsive to radial movement of the yieldably suspended brake member, and cam means for imparting radial movement to the last-mentioned brake member.

19. A brake mechanism of the class described, comprising a plurality of brake members disposed in opposed relation to each other and each having a braking surface cooperative with the other, one of said brake members being adapted to be mounted on a rotatable part to be braked, and another of said brake members being yieldably suspended for movement towards and away from the first, and also for radial and limited rotative movements relative to the first brake member, thrust means operable upon the yieldably suspended brake member to move the same towards the other brake member to engage the braking surfaces responsive to radial movement of the yieldably suspended brake member, and rockable cam means engaging the marginal edge of the yieldably suspended brake member for imparting radial movement thereto responsive to rocking movement of said cam means.

HOMER T. LAMBERT.

REFERENCES CITED

The following references are of record in the file of this patent:

UNITED STATES PATENTS

| Number | Name | Date |
|---|---|---|
| 1,824,332 | Davidson et al. | Sept. 22, 1931 |
| 2,245,988 | Lambert | June 17, 1941 |